(12) United States Patent
Monti et al.

(10) Patent No.: US 8,392,081 B2
(45) Date of Patent: Mar. 5, 2013

(54) METHOD FOR ASSISTING WITH HILL MANEUVERS

(75) Inventors: Alessandro Monti, La Garenne-Colombes (FR); Richard Pothin, Jouars-Pontchartrain (FR)

(73) Assignee: Renault S.A.S., Boulogne-Billancourt (FR)

( * ) Notice: Subject to any disclaimer, the term of this patent is extended or adjusted under 35 U.S.C. 154(b) by 312 days.

(21) Appl. No.: 12/743,916

(22) PCT Filed: Nov. 20, 2008

(86) PCT No.: PCT/EP2008/065896
§ 371 (c)(1),
(2), (4) Date: Jul. 30, 2010

(87) PCT Pub. No.: WO2009/065888
PCT Pub. Date: May 28, 2009

(65) Prior Publication Data
US 2011/0287895 A1      Nov. 24, 2011

(30) Foreign Application Priority Data
Nov. 21, 2007   (FR) ...................................... 07 59205

(51) Int. Cl.
*B60W 30/18*         (2012.01)
*B60W 50/02*         (2012.01)
*B60W 10/18*         (2012.01)

(52) U.S. Cl. ................. 701/65; 701/70; 701/78; 701/87
(58) Field of Classification Search .................... 701/51, 701/53, 65, 67, 70, 78, 87
See application file for complete search history.

(56) References Cited

U.S. PATENT DOCUMENTS 7,206,682 B2    4/2007   Bodin et al.
7,665,808 B2    2/2010   Deprez et al.

FOREIGN PATENT DOCUMENTS

FR    2828450      2/2003
FR    2841199     12/2003

*Primary Examiner* — James Trammell
*Assistant Examiner* — Frederick Brushaber
(74) *Attorney, Agent, or Firm* — Oblon, Spivak, McClelland, Maier & Neustadt, L.L.P.

(57) ABSTRACT

A method for assisting with hill maneuvers for a vehicle, including a propulsion unit connected to the drive wheels by a gearbox and a clutch or torque converter, and an assisted parking brake. In the method a threshold breakaway torque is determined as a function of longitudinal forces between the wheels of the vehicles and the ground. During a degraded operation, when a signal corresponding to a characteristic of the slope is received that cannot be used and/or when a computer does not have available a signal characteristic of an engaged gear ratio, a threshold value for the breakaway torque is determined without taking account of an actual value of the characteristic of the slope and/or of the characteristic of the gear ratio.

9 Claims, 4 Drawing Sheets

METHOD FOR ASSISTING WITH HILL MANEUVERS

Figure 1:
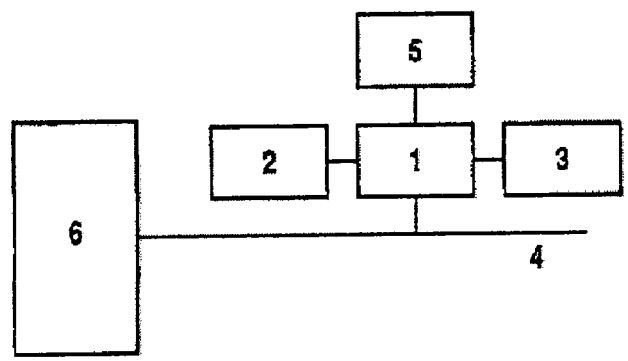

The present invention relates to method for assisting with hill maneuvers for a vehicle.

It more particularly concerns a method for assisting with hill starting in degraded conditions, for a motor vehicle with manual or automatic gearbox.

On some vehicles, the motor vehicle manufacturers offer an assisted parking brake.

This assisted parking brake has to provide a service that can be valued by the client, because of its relatively high cost compared to the traditional parking brake solution.

To add value to this system, manufacturers have therefore decided to associate with it a function for assisting with hill maneuvers and in particular for assisting with hill starts (or take-offs), the principle of which is to release the brakes on the non-drive wheels as soon as the torque transmitted by the engine to the drive wheels is sufficient to offset the effect of the hill slope.

A vehicle equipped with a conventional device for assisting with hill starts notably comprises a drive train, an assisted parking brake 5, a bus 4, which carries signals coming from the rest of the vehicle 6, and a computer 1 for controlling the drive train. The rest of the vehicle 6 notably comprises the gearbox.

The bus 4 is preferably a bus compliant with the CAN™ (control area network) standard.

The drive train consists of a heat engine coupled to drive wheels by a transmission device comprising a gearbox and a clutch, which can be controlled by the user (in the case of vehicles with manual gearboxes) or by an automatic control function (in the case of a vehicle equipped with an automatic gearbox).

As a variant, the drive train can include one or more electrical machines, with or without heat engine.

The device for assisting with hill starts cooperates with a computer 1 for controlling the assisted parking brake 5, which is also connected to the bus 4.

The computer 1 is equipped, as is known, with a means for producing commands to apply and release the assisted parking brake 5, said commands for the brake 5 being generated on a line connecting to the assisted parking brake 5 proper. Where appropriate, the computer 1 is also equipped with a means for transmitting to the bus 4 status information concerning the assisted parking brake 5.

The computer 1 for controlling the assisted parking brake 5 is connected by an appropriate line to a slope sensor 2. In other embodiments, if information on the inclination of the slope is available on the bus 4, the sensor 2 is replaced by an equivalent means which samples this information from the data stream carried by the bus 4.

When the vehicle is stopped on a slope, the slope sensor 2 delivers a signal representative of the inclination of the slope (also designated "characteristic of the slope") on which the vehicle is stopped.

When the computer 1 for controlling the assisted parking brake 5 produces an application release command, the moving parts of the brakes clamp the disks so that the assisted parking brake 5 is applied.

Conversely, when the computer 1 for controlling the assisted parking brake 5 produces a command to release the assisted parking brake 5, the moving parts of the brakes are released.

Moreover, in a start-up situation (whether on a hill or on level ground), the drive train of the vehicle produces a torque which is or is not transmitted to the wheels, depending on whether the clutch is engaged or not, and according to a fraction which depends on the position of the clutch.

Thus, conventionally, the principle of a method for assisting with hill starts consists in determining a condition for releasing the assisted parking brake 5, according in particular to the longitudinal force between the wheels of the vehicles and the ground, and therefore to the characteristic of the slope, measured when the user and the vehicle are ready to take off, and to the torque $C_T$ transmitted to the clutch.

This condition is determined in such a way that the vehicle is in a take-off situation as soon as a certain threshold is passed at which the slope effect is balanced out by the engine torque.

For this, the document FR 2 841 199 proposes a method for automatically releasing the assisted parking brake on start up, in which the threshold corresponds to a transmitted torque estimation threshold value, determined in order to balance the movement of the vehicle on the slope based on a measurement of the characteristic of the slope by means of a slope sensor and the knowledge of a value representative of the transmission ratio.

Also proposed in the document FR 2 828 450 is a device for assisting with hill starts for a vehicle comprising means for controlling the releasing of the mechanical brakes which act on the wheels of the vehicle, so that the vehicle remains secured on the slope during a hill maneuver without the driver having to intervene. For this, it utilizes the characteristic of the slope, indicated, for example, by a slope sensor, the interpretation and anticipation of the commands from the driver and/or from a central control member and the instantaneous characteristics of the clutch.

However, in their current form the algorithm for these devices does not work if the signal from the slope sensor (or from an equivalent means delivering information on the characteristic of the slope) cannot be utilized when starting the vehicle. This leads to a refusal to release the brakes, and to the starting of the vehicle while the moving parts of the brakes are not released.

Moreover, the absence (or the malfunction) of a clutch sensor, or even of information on the gear ratio engaged, may adversely affect the quality of the hill start.

One objective of the invention is therefore to mitigate the drawbacks of the prior art by proposing a method for assisting with hill maneuvers that enables a driver to start without damaging the brake device, and do so regardless of the reliability of the signal delivered by the slope sensor.

Another object of the invention is to propose a method for assisting with hill maneuvers that can operate even when the information on the position of the clutch and/or on the gear ratio engaged is not available.

Another object of the invention is to propose a method for assisting with hill maneuvers that can operate in degraded conditions while enabling the driver to perform his maneuver, but at the same time making him aware of the existence of a failure or malfunction of one of the component items of the associated device.

Finally, one object of the invention is propose a method for assisting with hill maneuvers that can be applied to vehicles provided with a manual or automatic gearbox.

For this, the invention proposes a method for assisting with hill maneuvers for a vehicle, comprising a drive train, connected to the drive wheels by means of a gearbox and a clutch or a torque converter, and an assisted parking brake, during which a threshold take-off torque is determined as a function of the longitudinal forces between the wheels of the vehicle and the ground, characterized in that, in degraded operation, that is to say when a signal corresponding to the characteristic of the slope that cannot be utilized is received and/or when the computer has no signal characteristic of the gear ratio engaged, a threshold value is determined for the take-off torque without taking into account the real value of the characteristic of the slope and/or of the characteristic of the gear ratio.

The method according to the invention can also comprise at least one of the following characteristics, when the device is in degraded operation:
when a signal corresponding to the characteristic of the slope that cannot utilized is received, the threshold value of the take-off torque is determined as a function of a predetermined value of the characteristic of the slope;
the predefined value corresponds to a slope characteristic for a take-off against the slope;
when information on the gear ratio engaged is not available, a value is determined for the threshold take-off torque without taking into account the gear ratio actually engaged;
when information on the gear ratio engaged is not available, the threshold value of the take-off torque is determined as a function of a predefined value for the gear ratio engaged;
the predefined value of the gear ratio engaged is set to the maximum value as an absolute value of said ratio;
to determine the value of the torque transmitted by the clutch or by the torque converter, account is taken of the error in the estimation of the transmitted torque and/or of the torque absorbed by the items connected to the drive train.

For this, the invention also proposes a device for assisting with hill maneuvers for a motor vehicle comprising a drive train connected to the drive wheels by means of a gearbox and a clutch or a torque converter, the device also comprising an assisted parking brake, a slope sensor and a computer, characterized in that it also comprises means for determining whether a signal characteristic of the slope delivered by the slope sensor can be utilized and/or means for determining whether a signal characteristic of the gear ratio is engaged, and in that the computer is arranged to determine a threshold value for the take-off torque without taking into account the real value of the characteristic of the slope and/or of the characteristic of the gear ratio.

Figure 2:
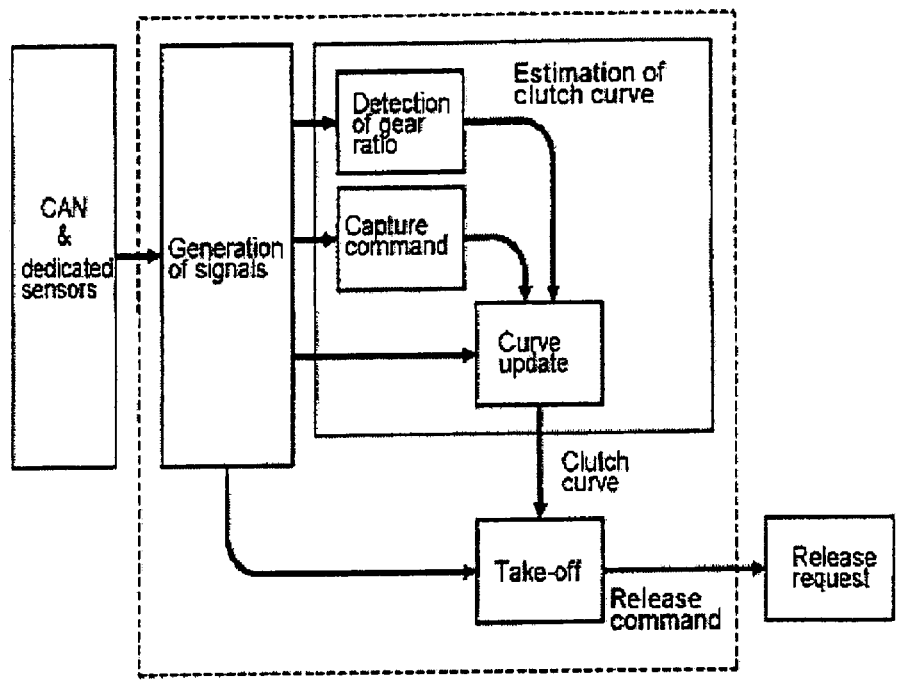
Figure 3:
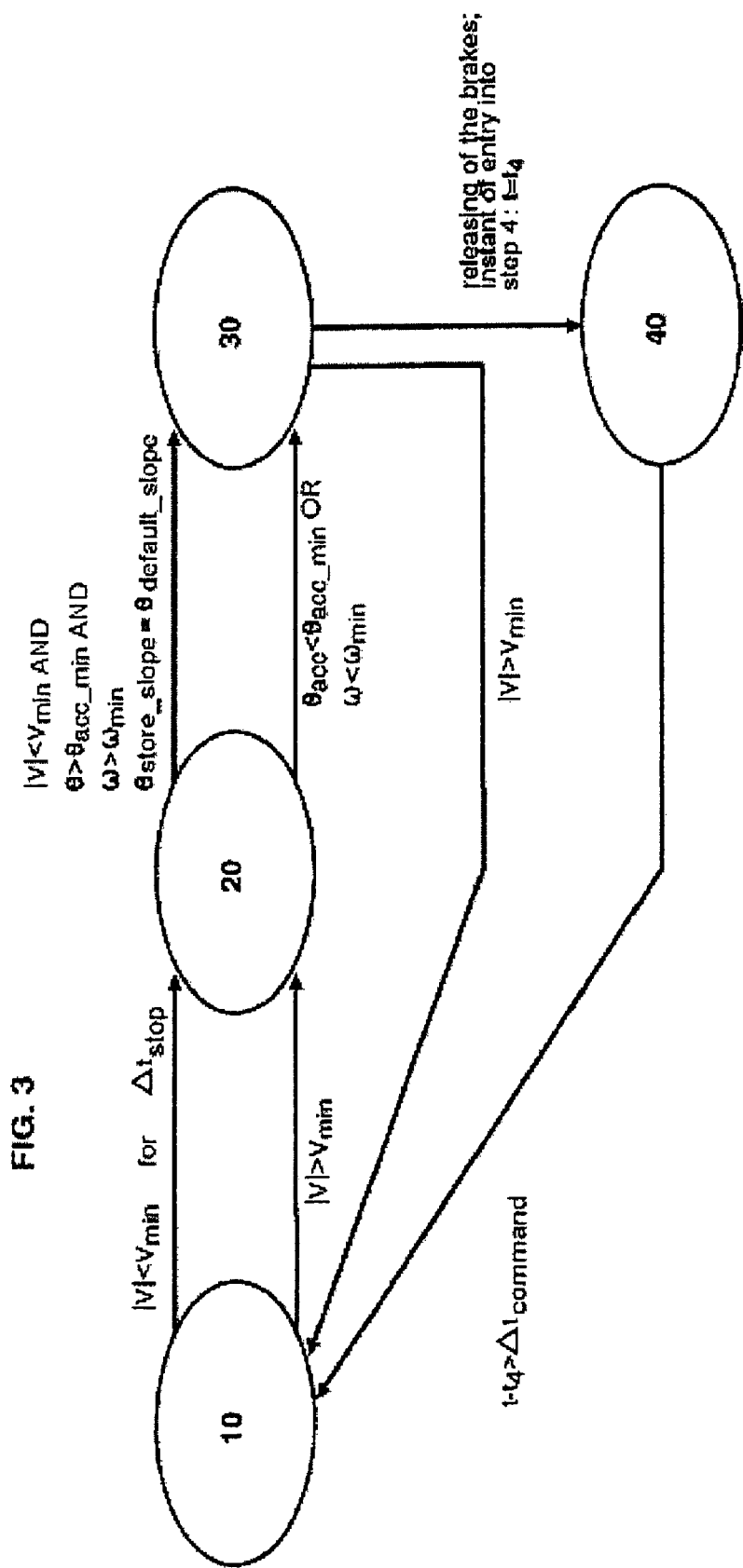
Figure 4:
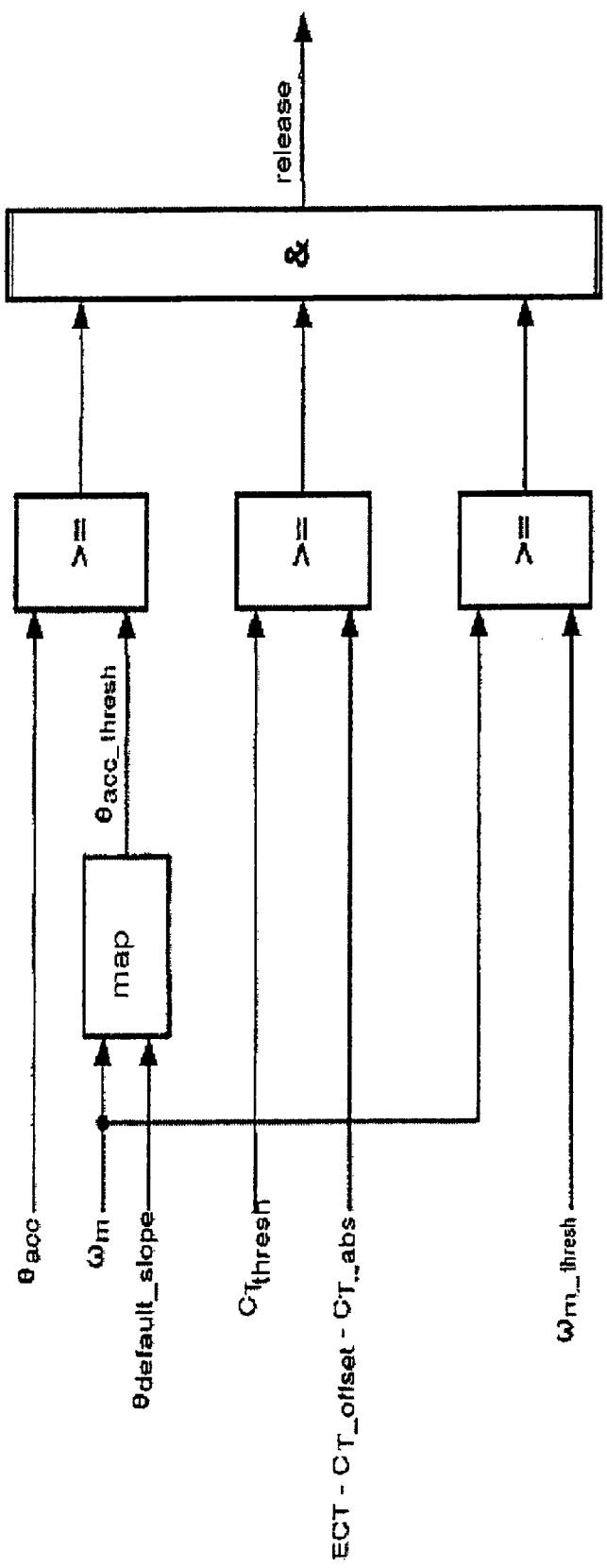
Figure 5:
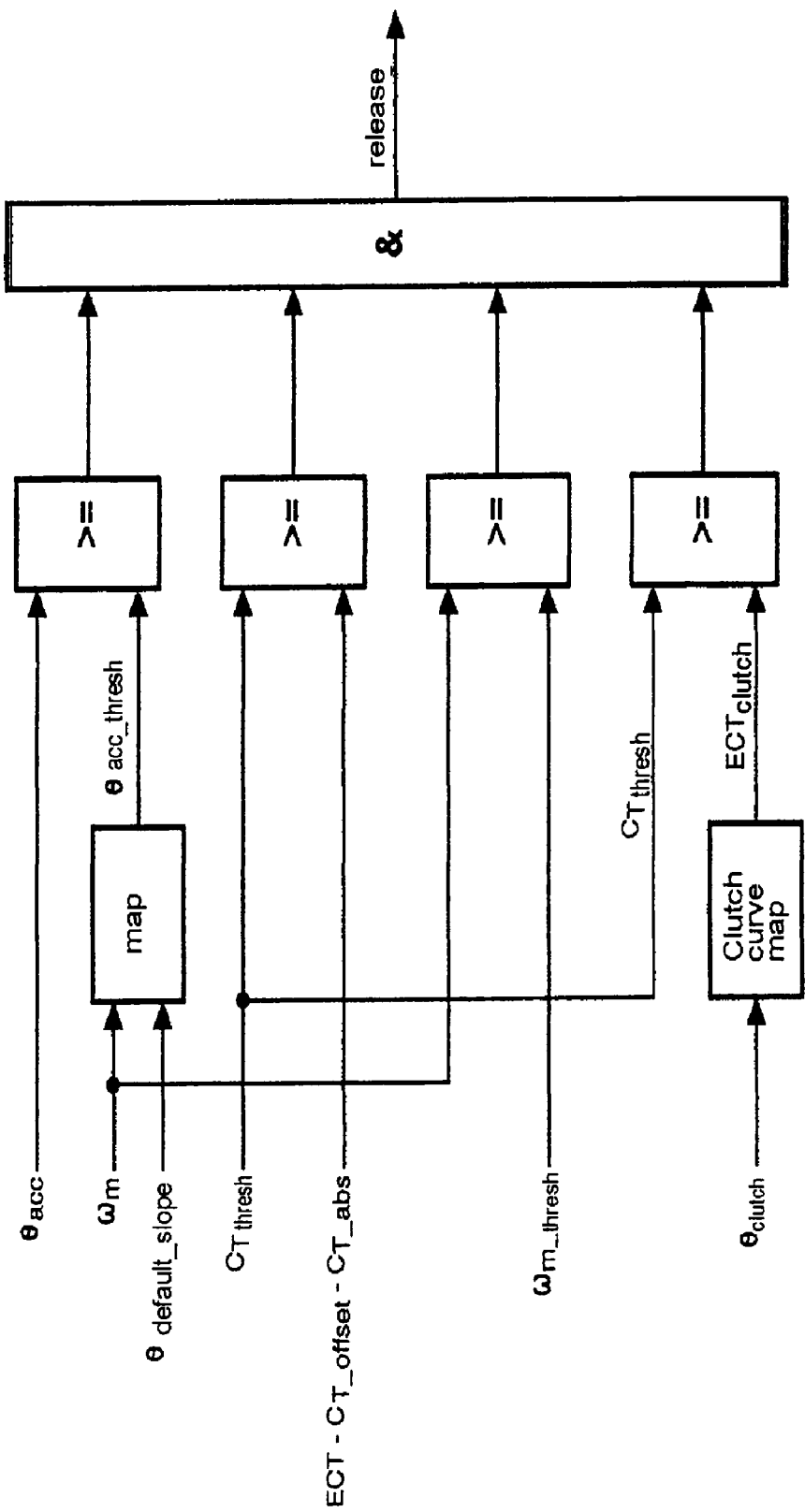

Other features, aims and advantages of the present invention will become apparent from reading the following detailed description, in light of the appended drawings, given as non limiting examples and in which:

FIG. 1 represents the functional architecture of a vehicle equipped with a device according to the invention, FIG. 2 represents the operating principle of the state machine that estimates the torque transmitted to the wheels of a vehicle that has a manual gearbox, implemented in the invention, FIG. 3 represents the state machine used in degraded mode, when the information on the characteristic of the slope is not available, to detect the situation in which the vehicle and the user are ready to take off, FIG. 4 represents a schematic of the method for assisting with hill starts according to the invention, in degraded mode, when the information on the characteristic of the slope is not available FIG. 5 represents a schematic of the method for assisting with hill starts according to the invention, in degraded mode, when the information on the characteristic of the slope is not available and a clutch pedal position sensor is used.

In order to take off, a vehicle parked on a slope must overcome the slope effect, due to the earth's gravity.

This effect is a function of the characteristic of the slope and of the weight of the vehicle, and has the value:

$$m \cdot g \cdot \sin(\theta_{slope})$$

in which
m is the weight of the vehicle,
g is gravity,
$\theta_{slope}$ is the characteristic of the slope.

The minimum torque $C_{T\_thresh}$ that must be transmitted to the wheels via the power flow, in order to enable the vehicle to take off (that is to say to start on the slope), must therefore be at least equal to:

$$C_{T\_thresh} = m \cdot g \cdot \sin(\theta_{slope}) \cdot r(b) \cdot \rho_{wheels}$$

in which
r(b) is the engaged gear ratio, corresponding to the position b of the gear lever,
$\rho_{wheels}$ is the static loaded radius of the wheels of the vehicle.

This torque $C_{T\_thresh}$ is the take-off threshold torque. The assisted parking brake 5 is released, in the start-up phase when stopped, only when the torque $C_T$ transmitted to the wheels is greater than the take-off threshold torque $C_{T\_thresh}$.

For manual gearboxes, the torque ECT transmitted by the clutch is estimated by a state machine such as that described by the French patent application FR 2 828 450 (illustrated by the appended FIG. 2, for a manual gearbox, and that we will not describe any further hereinafter in the description), whereas, for automatic and/or robotized and/or continuously variable gearboxes, the torque ECT is calculated then transmitted by a torque converter, according to known techniques.

The method according to the invention is implemented differently depending on the operating mode of the device for assisting with hill maneuvers.

In nominal operation, all the items of the assistance device are operating (the slope sensor in particular delivers a signal that can be utilized), and the algorithm utilizes the transmitted torque ECT (obtained by calculation or estimation), from the equation:

$$C_{T\_thresh} = m \cdot g \cdot \sin(\theta_{slope}) \cdot r(b) \cdot \rho_{wheels}$$

During take-off, since the vehicle has a tendency to camber, the information supplied by the sensor on the characteristic of the slope increases the estimation of the take-off threshold torque $C_{T\_thresh}$. To avoid this, the moment when the vehicle and its user are ready to take off is detected, and the characteristic of the slope corresponding to this instant is "frozen".

The expression "freezing" the characteristic should be understood to mean the committal to memory by storage means of the value of the characteristic $\theta_{slope}$ of the slope corresponding to this instant.

Said instant is detected using the state machine described by the patent application FR 07 56319 filed on 6 Jul. 2007 by the Applicant and will not be described further.

On the other hand, if the slope sensor delivers a signal that cannot be utilized, the assistance method operates in degraded mode.

More generally, it is assumed hereinafter in the description that the device operates in degraded mode when:
the signal delivered by the slope sensor cannot be utilized, and/or
when the computer (employed regardless of the gearbox type) does not have information on the engaged gear ratio.

Moreover, hereinafter in the description, it is assumed that a signal delivered by the slope sensor can be utilized when it corresponds to an acceptable slope characteristic $\theta_{slope}$ (for example to a characteristic, as an absolute value, of between 0° and approximately the maximum slope that can be negotiated by the vehicle, usually around 30°). On the other hand, the expression "signal that cannot be utilized" should be understood to mean either a signal corresponding to an absurd slope characteristic (for example, a characteristic with a value greater, as an absolute value, than 30°), or an absence of signal (which corresponds to a failed slope sensor).

The value of the take-off threshold torque $C_{T\_thresh}$ is then determined from a defined value A $\theta_{default\_slope}$ of the characteristic of the slope.

This determination is therefore independent of the real value of the characteristic of the slope, and corresponds, for safety reasons, to the value of the characteristic for a climb take-off (that is to say, against the slope), on a slope with steep inclination (typically, between approximately 20° and approximately 30° or a value close to the maximum slope that can be negotiated by the vehicle). The fact that the take-off threshold torque determined from the predefined characteristic $\theta_{default\_slope}$ has a higher value than the take-off threshold torque that would have been obtained from the real characteristic of the slope $\theta_{slope}$ is thus assured.

Thus, the fact that the take-off is correctly performed in the direction desired by the driver and that it is sufficient to move the car in the required direction when the moving parts of the brakes are released, is guaranteed. Also, the choice of such a value for the characteristic can be used to make the driver aware of the existence of a system fault (the latter sensing an unusual bump during take-off, due to the higher torque value than would have been needed in normal operation), without, however, immobilizing the vehicle or blocking the moving parts of the brakes during the start-up, unlike the methods and devices of the prior art.

The predefined value $\theta_{default\_slope}$ is therefore an adjustment parameter which enables the torque needed for take-off to be determined (by calculation or estimation).

In nominal operation, as in degraded operation, the algorithm of the method interprets the will of the driver.

In a first state 10, the speed v of the vehicle is above a defined minimum speed $v_{min}$.

The state machine then assumes that the vehicle is traveling.

In a second state 20, the speed v of the vehicle is below the minimum speed $v_{min}$ for at least a defined time $\Delta t_{stop}$.

The state machine then assumes the vehicle to be stopped (or at least that the vehicle is on the point of performing a hill maneuver).

If, in this second state, the speed v becomes greater than the minimum speed $v_{min}$ then the state machine returns to the initial state 10.

When the speed v of the vehicle is below the minimum speed $v_{min}$ from a time t longer than the time $\Delta t_{stop}$, when a gear ratio r(b) is engaged, when the user of the vehicle depresses the accelerator pedal to a position $\theta_{acc}$ greater than a defined threshold position $\theta_{acc\_min}$ (this position possibly, for example, being given as a percentage depression of the pedal), and when the angular rotation speed $\overline{\omega}_m$ of the drive train is greater than a minimum angular rotation speed $\overline{\omega}_{min}$, the state machine estimates that the user and the vehicle are ready to take off.

It should be noted that, in the case of manual gearboxes, one condition for estimating that the vehicle and the user are ready to take off is to check that the clutch pedal is depressed to a position $\theta_{clutch}$ (this position possibly, for example, being given as a percentage depression of the pedal) greater than a defined position $\theta_{clutch\_min}$.

$\theta_{clutch\_min}$ may correspond to the clutch curve's biting point. This can be identified as in the patent application FR 2 828 450.

The state of the slope sensor is then a determining factor in the rest of the method.

In nominal operation, the state machine generates an instruction to commit to memory the characteristic of the slope $\theta_{slope}$ which corresponds to the state in which the parameters fulfill said conditions, and switches to a third state 30. The transition from the state 20 to the state 30 can take place only if such a committal to memory is done.

In order to generate the instruction to commit to memory, a simple "sample and hold" mechanism is sufficient. We will henceforth designate this stored characteristic by the reference $\theta_{store\_slope}$.

$$C_{T\_threshold} = m \cdot g \cdot \sin(\theta_{store\_slope}) \cdot r(b) \cdot \rho_{wheels}$$

in which $\theta_{store\_slope} = \theta_{slope}$.

If the computer does not have information on the engaged gear ratio r(b), for example when the automatic gearbox computer is out of service or the dead center and/or reversing sensors are unreliable, it then determines the value of the torque needed to take off $C_{T\_thresh}$ from a predefined value $r_{max}$ of the gear ratio (degraded mode).

This calculation is therefore independent of the actually engaged gear ratio r(b), and corresponds, for safety reasons to the highest gear ratio $r_{max}$. The fact that the take-off threshold torque determined from this gear ratio has a value at least equal to that of the take-off threshold torque that would have been obtained from the actually engaged gear ratio is thus assured.

Thus, if information on the engaged gear ratio is not available, the following applies:

$$C_{T\_threshold} = m \cdot g \cdot \sin(\theta_{store\_slope}) \cdot r_{max} \cdot \rho_{wheels}$$

in which $\theta_{store\_slope} = \theta_{slope}$.

If the signal delivered by the slope sensor cannot be utilized (degraded mode), the state machine stores not the real characteristic $\theta_{slope}$ of the slope nor the characteristic corresponding to the signal that cannot be utilized, but the predefined value $\theta_{default\_slope}$. The method then switches to the state 30.

$$C_{T\_threshold} = m \cdot g \cdot \sin(\theta_{store\_slope}) \cdot r(b) \cdot \rho_{wheels}$$

in which $\theta_{store\_slope} = \theta_{default\_slope}$.

If, in addition, information on the engaged gear ratio is not available, the following applies $$C_{T\_threshold} = m \cdot g \cdot \sin(\theta_{store\_slope}) \cdot r_{max} \cdot \rho_{wheels}$$

with, once again, $\theta_{store\_slope} = \theta_{default\_slope}$.

The minimum torque $C_{T\_thresh}$ determined in order to take off is therefore obtained according to this stored information $\theta_{store\_slope}$, in nominal operation as in degraded operation, and no longer as a function of a characteristic delivered by the slope sensor.

The threshold torque $C_{t\_thresh}$ for take-off then takes the value:

- 0 if the stored slope characteristic ($\theta_{store\_slope}$) is positive or zero and reverse gear is engaged, or if the stored slope–($\theta_{store\_slope}$) is negative or zero and forward gear is engaged (normal operation);
- $m \cdot g \cdot \sin(\theta_{store\_slope}) \cdot r(b) \cdot \rho_{wheels}$, if the stored slope characteristic $\theta_{store\_slope}$ is strictly positive and forward gear is engaged, or if the stored slope $\theta_{store\_slope}$ is strictly negative and reverse gear is engaged, when information on the engaged gear ratio r(b) is available on the computer;
- $m \cdot g \cdot \sin(\theta_{store\_slope}) \cdot r_{max} \cdot \rho_{wheels}$ when the information on the engaged gear ratio r(b) is not available on the computer.

This definition of the take-off threshold torque $C_{T\_thresh}$ therefore makes it possible to set said threshold torque $C_{T\_thresh}$ in nominal conditions and in degraded conditions: slope information unreliable or absent and/or gear ratio information unreliable or absent.

If one of the conditions concerning the speed v of the vehicle, the position $\theta_{acc}$ of the accelerator pedal (or of the clutch pedal $\theta_{clutch}$ for a manual gearbox), the rotation speed $\overline{\omega}_m$ of the drive train, is not fulfilled, the state machine returns to the state 20 (transition from the state 30 to the state 20).

If the speed v (as an absolute value) of the vehicle becomes greater than the minimum $v_{min}$, the state machine returns to the state 10 (transition from the state 30 to the state 10).

If the torque ECT transmitted by the clutch (manual gearbox) or by the torque converter (automatic gearbox) is greater than or equal to the duly determined take-off torque $C_{T\_thresh}$, and if some of the conditions concerning the speed ($|V|<V_{min}$), concerning the position $\theta_{acc}$ of the accelerator pedal ($\theta_{acc}>\theta_{acc\_thresh}$), concerning the rotation speed $\overline{\omega}_m$ ($\overline{\omega}_m>\overline{\omega}_{m\_thresh}$) of the drive train are satisfied, the state machine then enters a fourth state 40, which corresponds to ordering the release of the brakes. For a manual gearbox, it is also possible to take into account a condition concerning the estimation of the torque transmitted by the clutch as a function of the position of the clutch pedal, by utilizing a learned clutch curve (see FR 2 828 450).

Upon entering this state 40, the take-off conditions are met.

Advantageously, $\theta_{acc\_thresh}$ depends on the value of the characteristic of the slope ($\theta_{store\_slope}$) taken into account by the computer according to the operating mode (normal or degraded) and the angular rotation speed $\overline{\omega}_m$ of the drive train.

The value $\theta_{acc\_thresh}$ can, for example, be estimated using a map of the accelerator.

For all the slopes and speeds mapped, the minimum position $\theta_{acc\_thresh}$ of the accelerator pedal needed for the engine speed to be sufficient to generate the torque needed for a take-off without stalling is measured.

This map can be determined beforehand by tests on tracks.

The expression "take-off conditions" should be understood here to mean the conditions for which the state machine assumes that the car and the user are ready to take off, in other words based on the torque $ECT \geq C_{T\_thresh}$, the position $\theta_{acc}$ of the accelerator pedal, based on the rotation speed $\omega_m$ of the drive train, and, where appropriate, based on the position $\theta_{clutch}$ of the clutch pedal.

When the state machine enters the state 40, the computer 1 orders the release of the assisted parking brake 5. At that point, t=$t_4$, in which $t_4$ corresponds to the time at which the state machine entered the state 40.

The state machine remains in the state 40 for a certain time $\Delta t_{command}$ before returning to the state 10 if the vehicle has taken off (when $t-t_4 > \Delta t_{command}$).

The state machine remains in the state 40 for a certain time $\Delta t_{command}$ before returning to the state 30, if the vehicle has not taken off and the client has lifted their foot off the accelerator pedal or, where appropriate, the clutch pedal.

As a variant, to ensure that the transmitted torque ECT is at least equal to the take-off torque, and thus ensure that the start-up takes place correctly in the direction desired by the driver, the torque taken into account by the computer for the vehicle take-off is equal to the difference between the value of the transmitted torque ECT (estimated or calculated, for example using the method described in the application FR 2 828 450) and an additional torque value $C_{T\_offset}$, set to a known value.

The use of the estimated torque ECT is necessary in particular when the information on the engaged gear ratio is not available, given that the map of the clutch curve is inadequate since it is associated only with the position of the clutch pedal (no torque being transmitted if no gear ratio is engaged).

In the case where the information on the engaged gear ratio is available, the use of the transmitted torque ECT is not strictly necessary, but it can be used in order to increase the reliability of the release command.

For example, the uncertainty for the calculated ECT value is chosen for $C_{T\_offset}$.

Furthermore, provision is made for the torque $C_{T\_abs}$ absorbed by the items connected to the drive train to be also taken into account.

For this, it is possible, for example, to calculate the average of the torques ECT transmitted when the state machine is in the state 20. In practice, either the device is declutched ($\theta_{clutch} < \theta_{clutch\_min}$), in which case the torque transmitted by the clutch is zero, or the accelerator pedal is not depressed ($\theta_{acc} < \theta_{acc\_min}$), in which case the transmitted torque is equal to the torque $C_{T\_abs}$ absorbed by the items connected to the drive train. Thus, by assuming that this torque $C_{T\_abs}$ is constant during take-off, it can be guaranteed that the quantity $ECT - C_{T\_offset} - C_{T\_abs}$ truly represents the torque transmitted by the clutch, available for take-off (see FIG. 5).

At the theoretical instant of release of the brakes (transition to the state 40), the torque supplied by the engine must be at least greater than the torque transmitted in the clutch, because, otherwise, the engine will almost always stall.

There is no stalling of the vehicle given the following conditions:
the driver accelerates to avoid stalling,
the engine speed is sufficient to generate the torque demanded by the driver.

These conditions are met by the map of the accelerator.

The invention claimed is:

1. A method for assisting with hill maneuvers for a vehicle, including a drive train, connected to the drive wheels by a gearbox and a clutch or a torque converter, and an assisted parking brake, comprising:
   determining a threshold take-off torque as a function of longitudinal forces between the wheels of the vehicle and the ground,
   wherein in a degraded operation, when a signal corresponding to a characteristic of slope that cannot be utilized is received and/or when a computer has no signal characteristic of a gear ratio engaged, a threshold value is determined for the take-off torque without taking into account a real value of the characteristic of the slope and/or of the characteristic of the gear ratio.

2. The assistance method as claimed in claim 1, wherein, in the degraded operation, when a signal corresponding to the characteristic of the slope that cannot be utilized is received, the threshold value of the take-off torque is determined as a function of a predetermined value of the characteristic of the slope.

3. The assistance method as claimed in claim 2, wherein, in the degraded operation, the predefined value corresponds to a slope characteristic for a take-off against the slope.

4. The assistance method as claimed in claim 1, wherein, in the degraded operation, when information on the gear ratio engaged is not available, a value is determined for the threshold take-off torque without taking into account the gear ratio actually engaged.

5. The assistance method as claimed in claim 4, wherein, in the degraded operation, when information on the gear ratio engaged is not available, the threshold value of the take-off torque is determined as a function of a predefined value for the gear ratio engaged.

6. The assistance method as claimed in claim 5, wherein, in the degraded operation, the predefined value of the gear ratio engaged is set to a maximum value as an absolute value of the ratio.

7. The assistance method as claimed in claim 1, wherein, to determine the value of the torque transmitted by the clutch or by the torque converter, account is taken of an error in an estimation of the transmitted torque and/or of the torque absorbed by items connected to the drive train.

8. A device for assisting with hill maneuvers for a motor vehicle including a drive train connected to the drive wheels by a gearbox and a clutch or a torque converter, the device comprising: an assisted parking brake; a slope sensor; a computer; and
    means for determining whether a signal characteristic of a slope delivered by the slope sensor can be utilized and/or means for determining whether a signal characteristic of a gear ratio is engaged, wherein the computer is configured to determine a threshold value for take-off torque without taking into account a real value of the characteristic of slope and/or of the characteristic of the gear ratio.

9. A device for assisting with hill maneuvers comprising:
    means for determining a threshold take-off torque as a function of longitudinal forces between the wheels of the vehicle and the ground,
    wherein in a degraded operation, when a signal corresponding to a characteristic of slope that cannot be utilized is received and/or when a computer has no signal characteristic of a gear ratio engaged, a threshold value is determined for the take-off torque without taking into account a real value of the characteristic of the slope and/or of the characteristic of the gear ratio.

* * * * *